United States Patent [19]

Mishiro

[11] Patent Number: 4,635,483

[45] Date of Patent: Jan. 13, 1987

[54] DRIVING CONTROL METHOD OF ULTRASONIC TRANSDUCER

[75] Inventor: Shoji Mishiro, Kawasaki, Japan

[73] Assignee: Taga Electric Co., Ltd., Tokyo, Japan

[21] Appl. No.: 829,930

[22] Filed: Feb. 18, 1986

Related U.S. Application Data

[63] Continuation of Ser. No. 636,629, Aug. 1, 1984, Pat. No. 4,577,500.

[30] Foreign Application Priority Data

Aug. 5, 1983 [JP] Japan ................................ 58-143593

[51] Int. Cl.⁴ ................................................ G01N 29/00

[52] U.S. Cl. ...................................................... 73/579

[58] Field of Search .......................... 73/579, 602, 662

[56] References Cited

U.S. PATENT DOCUMENTS

| | | | |
|---|---|---|---|
| 4,114,454 | 9/1978 | Ernyei et al. | 73/579 |
| 4,470,306 | 9/1984 | Opara | 73/602 |
| 4,577,500 | 3/1986 | Mishiro | 73/579 |

*Primary Examiner*—Anthony V. Ciarlante
*Attorney, Agent, or Firm*—Oblon, Fisher, Spivak, McClelland & Maier

[57] ABSTRACT

In an ultrasonic transducer, frequency characteristics of phase detecting signal and frequency characteristics of transducer drive current are searched, resonant point with current dipping is found on the characteristics, the zero cross point corresponding to the current dipping is decided as the fundamental resonant point, and then PLL follow oscillation is performed. In such constitution, even if there exist many sub resonant frequency points near the fundamental resonant frequency, the PLL follow oscillation can be performed stably.

2 Claims, 4 Drawing Figures

DRIVING CONTROL METHOD OF ULTRASONIC TRANSDUCER

This is a continuation of application Ser. No. 636,629, filed Aug. 1, 1984, now U.S. Pat. No. 4,577,500.

BACKGROUND OF THE INVENTION

1. Field of the Invention

The present invention relates to a drive control method for an ultrasonic transducer.

2. Description of the Prior Art

Normally, an ultrasonic transducer is preferably driven at the fundamental resonant frequency which is inherent in its vibration mode in order to provide improved electro-mechanical conversion efficiency. However, since the peak of resonance Q is high in general, even when the driving frequency is only slightly shifted from the resonant frequency the conversion efficiency will be significantly decreased. Consequently a driving oscillator with an automatic following apparatus is widely used for automatically detecting the resonant point of the ultrasonic transducer automatically providing subsequent oscillations.

When the resonant length of the mechanical vibratory system including the ultrasonic transducer as well as horns, tools and the like is about one wavelength or less and when the amplitude multiplication factor is not large, no serious problems occur. However, if the resonant length increases beyond one wavelength or if the multiplication factor becomes large, many sub resonant frequency points appear near the fundamental resonant frequency and therefore the oscillation may be transferred to sub resonant points when oscillation starts or when rapid variation of load occurs. This significantly obstructs the reliability of the ultrasonic wave generating apparatus. Furthermore, in such mechanical vibratory system having many sub resonant points, if the horn or tool is replaced by other part of different fundamental resonant frequency, the required resonant frequency selection and the subsequent oscillations are difficult to attain.

A number of systems have been used in practice as automatic following apparatus of resonant frequency. In many cases, vibratory velocity of the ultrasonic transducer is detected and the frequency of the driving signal is controlled so that its phase relationship to the drive voltage or drive current becomes constant. Such detecting methods of vibratory velocity signal include a method wherein a detecting element such as electro-strictive element is attached to part of a mechanical vibrator and the generated voltage is detected and a method wherein different motion signals are detected in differential form corresponding to vibratory stress arranged in a plurality of electro-strictive elements.

An example of the frequency characteristics of the phase relationship of a detecting signal is shown in FIG. 1(*a*) with the and frequency characteristics of the amplitude of drive current flowing through a transducer being shown in FIG. 1(*b*). In FIG. 1(*a*), the follow control region of the oscillator has the resonant frequency $f_o$ at the center the phase lead region at the low frequency side and a phase lag region at the high frequency side and is limited to the region $f_1$–$f_2$, for example. The variation of the resonant frequency within the limited region is followed and driven. If the resonant frequency varies beyond the limited region, that is, if it is transferred to the resonant frequency $f_o$ as shown in FIG. 2, an abnormal vibratory state as shown in point B of FIG. 2(*a*) will occur where oscillation is generated at sub resonant point even if the following region of the oscillation is enlarged.

As above described, if the horn or tool connected to the ultrasonic transducer is replaced by various parts, such as the horn or tool which are of a different resonant frequency, the conventional following method cannot detect the fundamental resonant frequency on account of many sub resonant points existing near the fundamental resonant frequency.

OBJECTS OF THE INVENTION

A first object of the invention is to discriminate the fundamental resonant frequency with certainty even if there exist many sub resonant frequency points near the fundamental resonant frequency.

A second object of the invention is to perform the resonant point search at equal band width with respect to the high frequency side and the low frequency side even if an asymmetric phase inversion point appears due to the structure of to the vibratory system.

BRIEF DESCRIPTION OF THE DRAWINGS

FIG. 1(*b*) is a graph illustrating the frequency characteristics of the drive current corresponding to FIG. 1(*a*):

FIG. 2(*b*) is a graph illustrating the frequency characteristics of the drive current corresponding to FIG. 2(*a*);

FIG. 3(*b*) is a graph illustrating frequency characteristics of the detecting signal after correction;

FIG. 3(*c*) is a graph illustrating frequency characteristics of the drive current and FIG. 4 is a diagram of a driving circuit according to the present invention.

DESCRIPTION OF THE PREFERRED EMBODIMENT

An embodiment of the invention will now be described in detail referring to the accompanying drawings. In this embodiment, system control is performed by a microcomputer. Input/output operation of the control data to the microcomputer is designated by thick arrow in the FIG. 4 and flow direction of data is represented by the direction of the arrow.

Figure 4:
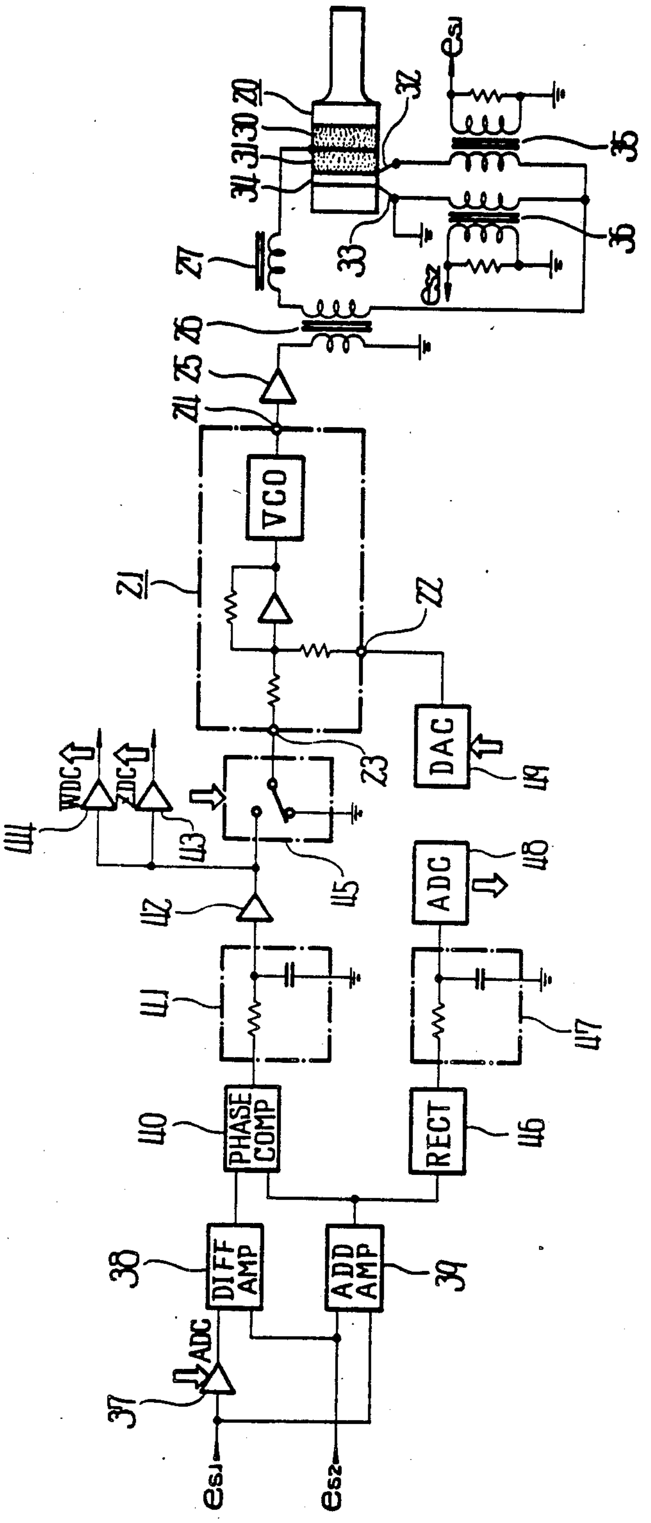

In FIG. 4, a voltage-controlled oscillator 21 to determine the drive frequency of an ultrasonic transducer 20 has sweep input terminal 22 and PLL (Phase-Locked Loop) input terminal 23, and an output voltage, the frequency of which is controlled by voltage applied to such input terminals, is fed through output terminal 24 into an amplifier 25 for power amplification. The amplified output is transformed by an output transformer 26, and the transformed output is subjected to conjugated matching by a series inductor 27 and then applied to electro-strictive elements 30, 31 of the ultrasonic transducer 20.

Since an insulation plate 34 is inserted between a ground electrode 32 of the electro-strictive element 31 and a ground terminal 33 of the element 30 of the transducer 20, current flowing in the electro-strictive element 31 passes through the terminal 32 and one current detecting transformer 35 to the secondary coil of the output transformer 26. Current flowing in the electrostrictive element 30 passes through the terminal 33 to another current detecting transformer 36 and is also returned to the secondary coil of the output transformer 26.

Consequently, secondary voltage values $e_{s1}$, $e_{s2}$ of the current detecting transformers 35, 36 are proportional to currents flowing in the electro-strictive elements 31, 30, respectively. The detecting signal $e_{s1}$ is inputted to a digital controlled amplifier 37 and amplified on the basis of data supplied from the microcomputer, and then the difference between the amplified voltage of the amplifier 37 and the detecting signal $e_{s2}$ is produced by a differential amplifier 38 and becomes one input of a phase comparator 40.

Figure 1:
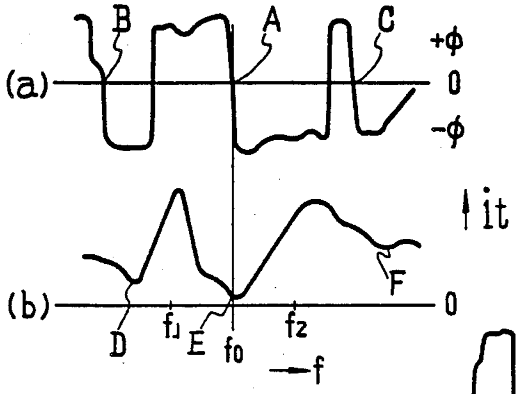
FIG. 1(*a*) is a graph illustrating frequency characteristics of the phase relation of a detecting signal.

The voltage gain of the digital controlled amplifier 37 is varied by controlled data from the microcomputer. If the voltage gain is set to 1, the output of the differential amplifier 38 is proportional to the difference between currents flowing in the electrostrictive elements 30, 31 of the ultrasonic transducer 20, i.e. vibratory velocity signal. The signal has frequency characteristics of phase difference respect to the transducer current as shown in FIG. 1(*a*) for example.

The detecting signals $e_{s1}$, $e_{s2}$ are summed by a summing amplifier 39, and the output voltage, i.e. signal being proportional to the transducer driving current, becomes the other input of the phase comparator 40 and is compared with the differential signal in phase relation. Output of the comparator 40 passes through an integrator 41 and d.c. amplifier 42 and becomes a signal representing phase relation between the vibratory velocity signal and the transducer current. The signal is connected to a zero cross detector 43, a window comparator 44 and the make contact of a switch 45. The break contact of the switch 45 is grounded, and the common terminal is connected to PLL input terminal 23 of the voltage-controlled oscillator 21. The output of digital/analog converter 49 is connected to a sweep input terminal 22.

Transducer current signal from the summing amplifier 39 is rectified by a rectifier 46 and then smoothed by an integrator 47. The smoothed signal has frequency characteristics of envelope as shown in FIG. 1(*b*) for example, and is converted by analog/digital converter 48 into digital signal and taken in the microcomputer.

Operation of the apparatus in above constitution is performed as hereinafter described. The voltage gain of the digital controlled amplifier 37 is set to 1 by digital control from the microcomputer, and then output voltage of the digital/analog converter 49 is increased from zero as time lapses, thereby oscillation frequencies of the voltage-controlled oscillator 21 are swept from lower to higher. Then at each frequency step, the zero cross detector 43 discriminates whether the detection phase difference output is plus or minus, that is, whether the phase is lead or lag. The envelope of the transducer current is taken as data in the memory of the microcomputer. When the frequency sweep is finished and storage of data is also finished, the transducer current data is searched and the minimum value at a certain region is determined.

Current value in the lowest frequency is compared with current value of frequency at next step in sequence. If value at next step is large than that at previous step by one step, value at the previous step is taken as reference value and the search is performed from the reference value within certain frequency region, e.g. ±500 Hz. If value in the search region is not less than the reference value and larger than certain value, e.g. 5 at both ultimate values in the frequency width, the reference value is deemed as minimum value.

Next, the state of detecting phase at frequency of the reference point is performed. Search of certain frequency region, e.g. 100 Hz is performed towards lower frequency if data is lag phase and towards higher frequency if data is lead phase. Inversion point at phase characteristics during the search is made the new resonant point.

If there is no phase inversion point within 100 Hz, the reference point is deemed not to be the resonant frequency. Then the search of minimum current point is again continued from the reference point.

In FIG. 1, points D, E, F are detected as minimum from the current data, but points B, C are too far from the minimum current point and therefore excluded. As the result, point A is deemed as the fundamental resonant point.

The search criterion is based on the fact that inversion of phase characteristics occurs rapidly at the resonant point and minimum current point exists near the resonant point.

Figure 2:
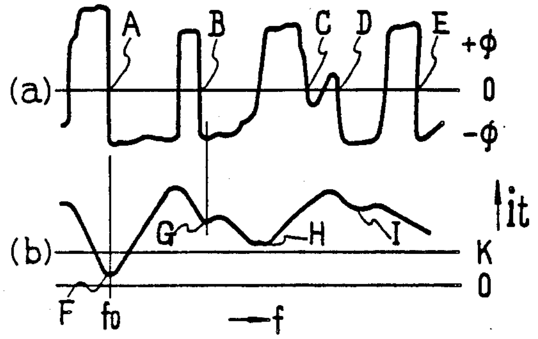
FIG. 2(*a*) is a graph illustrating frequency characteristics of the phase relation of another detecting signal.

FIG. 2 shows detecting phase characteristics (FIG. 2(*a*)) and transducer current characteristics (FIG. 2(*b*)) when the horn or tool is replaced by another part. The fundamental resonant frequency $f_o$ in FIG. 2 is decreased considerably e.g. by 2 kHz in comparison to FIG. 1 Consequently, discrimination of the fundamental resonant frequency is impossible from only zero cross point of phase characteristics in FIG. 2(*a*). However, if reference is made to current characteristics in FIG. 2(*b*) and the correlation is noticed, the decision can be done easily. Further in FIG. 2, point G is disposed near the point B and therefore apt to be discriminated as resonant frequency. If the decision with regard to the minimum current point is specified by condition that it must be lower than line K in current level reference graph of FIG. 2(*b*), the point G can be excluded.

After the fundamental resonant point is determined as zero cross point in above procedure, the voltage-controlled oscillator 21 is set to its frequency by the digital-/analog converter 49 and then the switch 45 is changed and the ultrasonic transducer 20 is driven under PLL control. Currents flowing in the electro-strictive elements 30, 31 are taken as the detecting voltages $e_{s2}$, $e_{s1}$ respectively. The difference between both currents is used as the vibratory velocity detecting signal and summing of both currents is used as transducer drive current, thereby comparison of phase is performed and voltage being proportional to the phase difference becomes the output of the d.c. amplifier 42 and controls the voltage-controlled oscillator 21.

As a result, the feedback loop is formed and the zero cross point is followed and frequency of the voltage-controlled oscillator is controlled.

At a subsequent drive state, the microcomputer monitors the output of the window comparator 44 and decides whether or not the phase difference is within the set value. When the phase difference is shifted significantly on account of abnormal state of the mechanical vibratory system or the like and the follow action cannot be performed, output of the window comparator varies and the computer stops action of the apparatus.

Figure 3:
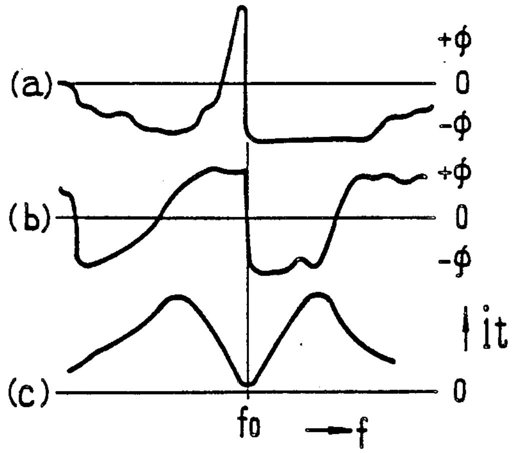
FIG. 3(*a*) is a graph illustrating frequency characteristics of the phase relation of a detecting signal.

Next, a further improved method will be described. It is preferable that the detecting phase characteristics have nearly equal frequency widths from the fundamental resonant frequency $f_o$ at a center to the zero cross point at low and high frequency ares as shown in FIG. 1(*a*). However, an asymmetric phase inversion point may appear based on the vibratory system including the ultrasonic transducer 20, horn and tool. In FIG. 3(*a*) for example, the frequency region with respect to $f_o$ is significantly narrow in comparison to the high frequency region thereby the stable frequency following is obstructed. Such condition is significantly dependent on difference of damped capacitance of electro-strictive elements in the transducer, accuracy of the differential detection and level of the detecting signal, constitution of the mechanical vibratory system or the like.

When decision of the fundamental resonant point is performed by checking the detecting phase signal, the differential balance is set and correction of phase characteristics is performed as hereinafter described.

After the fundamental resonant point is determined by search of the zero cross point, search toward low frequency from the resonant point as the center is performed in a certain frequency width, e.g. 1 kHz for checking whether or not the phase inversion exists. If the phase inversions exists, the differential balance is adjusted by the voltage gain of the digital controlled amplifier 37 so as to extend the area from the resonant point to the inversion point. The high frequency side is also checked and adjusted in similar manner.

By adjusting the differential balance as above described, the detecting phase characteristics shown in FIG. 3(*a*) is made approximately symmetric as shown in FIG. 3(*b*).

In adverse condition where the width of 1 kHz cannot be corrected at both high frequency side and low frequency side, the correction width is decreased in sequence for example 800 Hz and further 600 Hz, thereby the symmetry is performed.

By such setting action, the detecting phase characteristics during the PLL following operation are always the best state, thereby compatibility of the mechanical vibratory system is further improved and the frequency range to enable capturing of the resonant frequency for the various tool operation is enlarged and the effect is exhibited.

Although search of the resonant point is performed by determining the minimum current point on drive current characteristics of the transducer as above described if the transducer driving system operates to parallel resonance as shown in FIG. 4, then, at series resonance maximum current point is determined aalso.

In the present invention as above described, when the mechanical vibratory system including the ultrasonic transducer has many sub resonant points near the fundamental resonant frequency and further when the system, which varies in fundamental resonant frequency on account of the tool changing or the like a is driven, decision of the fundamental resonant frequency is performed not only by phase difference characteristics between the vibratory velocity signal and the drive voltage or current as in the prior art but also by the correlation to the resonant point on the drive current characteristics, and then the phase difference signal is followed and the oscillating operation is performed. The invention further enables the compatibility in the mechanical vibratory system which has been impossible by the asymmetry of flat width of phase difference characteristics at high frequency side and low frequency side. Moreover, the invention has many effects in that there is no unstable operation such as transferring of the oscillating frequency to sub resonant point at the oscillation starting or the rapid variation of load thereby the oscillation and driving operation with high stability is enabled.

What is claimed is:

1. A driving control method for an ultrasonic tranducer, comprising the steps of:
   - measuring the transducer current and determining the transducer current characteristics;
   - determining the vibratory velocity detecting signal of said transducer based upon said transducer current;
   - determining the phase characteristic of said vibratory velocity detecting signal with respect to said transducer current;
   - locating a zero cross point based on said phase characteristics;
   - locating the resonant points of the operation of said transducer based upon said current characteristics;
   - determining the fundamental resonant point based upon the relationship of the zero cross point of said phase characteristic with respect to the location and current value of said resonant point; and
   - performing a phase lock-loop control oscillation to drive said transducer.

2. A driving control method for an ultrasonic tranducer, comprising the steps of:
   - measuring the transducer current and determining the transducer current characteristics;
   - determining the vibratory velocity detecting signal of said transducer based upon said transducer currence;
   - determining the phase characteristic of said vibratory velocity detecting signal with respect to said transducer current;
   - locating a zero cross point based on said phase characteristics;
   - locating the resonant points of the operation of said transducer based upon said current characteristics;
   - determining the fundamental resonant point based upon the relationship of the zero cross point of said phase characteristic with respect to the location and current value of said resonant point; and
   - controlling a differential balance so that said phase characteristics of said vibratory velocity detecting signal are made symmetric with respect to said resonant point at the high frequency side and the low frequency side of said fundamental point; and
   - performing a phase-lock-loop oscillation operation of said transducer.

* * * * *